J. A. HAMELBACK.
TWINE HOLDER.
APPLICATION FILED NOV. 2, 1914.
1,137,133.  Patented Apr. 27, 1915.
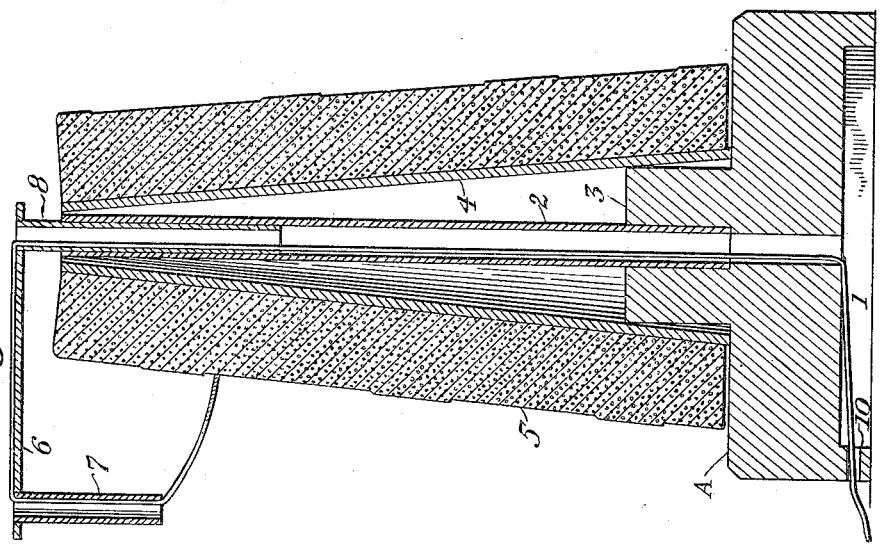
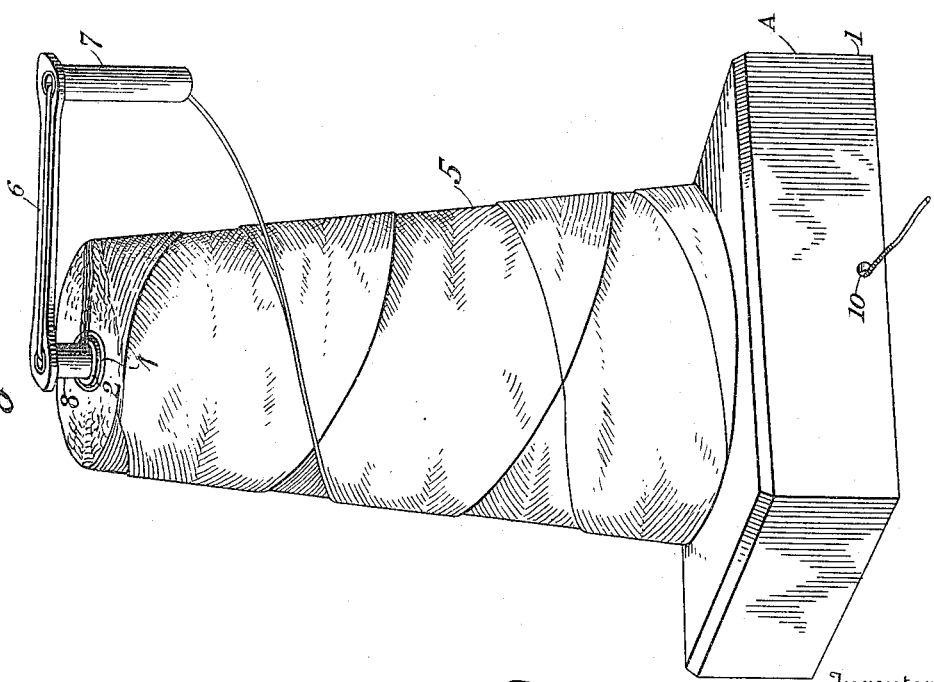
Witnesses
Frank H. Borden
A. A. Hammond
Inventor
Jacob A. Hamelback
By Laurie Bogger
Reid Attorneys

UNITED STATES PATENT OFFICE.

JACOB A. HAMELBACK, OF NEWARK, OHIO, ASSIGNOR OF ONE-HALF TO JOSEPH W. HORNER, OF NEWARK, OHIO.

TWINE-HOLDER.

1,137,133.  Specification of Letters Patent.  Patented Apr. 27, 1915.

Application filed November 2, 1914. Serial No. 869,860.

*To all whom it may concern:*

Be it known that I, JACOB A. HAMELBACK, a citizen of the United States, residing at Newark, in county of Licking and State of Ohio, have invented certain new and useful Improvements in Twine-Holders, of which the following is a specification.

My invention relates to an improvement in twine-holders of the commercial type, adapted for use in any store service for holding the twine and from which to unwind it as required for wrapping and tying a bundle.

This invention consists in a base or support; a hollow post erected therefrom and having a hub on its lower end whereby the post and hub afford a rotatable support for the ball of twine; and an arm having a tube at each end through which the twine is threaded, one tube to enter the upper end of the hollow post upon which it is rotatably and removably supported, and the other to receive the twine from the ball and guide and feed it and turn with the unwinding twine as the latter is drawn from the holder.

My invention further consists in mechanical details which will be hereinafter fully described and pointed out in the claim.

In the accompanying drawings: Figure 1 is a view in perspective, and Fig. 2 is a vertical section.

A, represents a base made of any suitable material, such as cast-iron for example, preferably in rectangular form, although it might be circular. This may be mounted on a rim 1, or on legs, if preferred. Erected from the center of the base is a hollow post 2, which receives the spool or ball of twine; and a hub 3 at the base of the post approximately fits the lower end of the core 4 of the ball or spool of twine 5. An arm 6 has two tubes 7 and 8, one at either end. The tube 7 is constructed and adapted to fit and turn in the upper end of the hollow post, and the other tube 8 is intended to depend and travel around the twine, receiving the latter, which is threaded through it and thence down through tube 7 and the hollow post 2, and a hole 10 in or beneath the base is adapted to receive the twine from the ball or spool at the nearest point, and to swing around the latter as the twine is drawn therefrom through the base. This affords a simple arrangement, is easily taken apart and put together and applied to its purpose, as it simply requires threading an end of the twine through, as illustrated, first from the lower end of the outer tube 8, through the tube 7 and the hollow post 2, thence out laterally through the side of the base, or rim beneath the latter upon which the base rests. The ball or spool of twine does not turn, but the twine is unwound from its surface as it is required. Should an unnecessary amount of the twine be drawn out, it can be rewound very easily by simply taking hold of the arm and turning it the necessary number of times around the stationary ball until the twine is drawn back and the required length left for use.

The twine-holder as outlined in the specification is simple, inexpensive, and effectual in the performance of its functions.

It is evident that slight changes might be resorted to in the form and arrangement of the several parts described without departure from the spirit and scope of my invention, and hence I do not wish to be limited to the exact construction herein set forth, but:—

I claim:—

A twine-holder comprising a support, a hollow post, and a removable arm having a tube at either end, one of which fits and turns in the upper end of the post and the other of which is adapted to receive the twine through its lower end on its way alongside the arm and thence downward through the other tube, the post, and out at some convenient point on the support.

In testimony whereof I affix my signature in the presence of two witnesses.

JACOB A. HAMELBACK.

Witnesses:
JOSEPH L. W. HORNER,
BLANCHE M. FULTON.

Copies of this patent may be obtained for five cents each, by addressing the "Commissioner of Patents, Washington, D. C."